United States Patent
Nagaraj

(10) Patent No.: US 7,900,006 B2
(45) Date of Patent: Mar. 1, 2011

(54) MAINTAINING CHECKPOINTS DURING BACKUP OF LIVE SYSTEM

(75) Inventor: Prasad Nagaraj, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 457 days.

(21) Appl. No.: 12/113,011

(22) Filed: Apr. 30, 2008

(65) Prior Publication Data

US 2009/0276590 A1     Nov. 5, 2009

(51) Int. Cl.
*G06F 12/00*     (2006.01)
(52) U.S. Cl. .......................................................... 711/162
(58) Field of Classification Search ................... 711/162, 711/202, 167; 714/4, 5, 6
See application file for complete search history.

(56) References Cited

U.S. PATENT DOCUMENTS

| | | | |
|---|---|---|---|
| 5,835,953 A | 11/1998 | Ohran | |
| 6,170,044 B1 | 1/2001 | McLaughlin et al. | |
| 7,370,164 B1 * | 5/2008 | Nagarkar et al. | 711/162 |
| 7,412,460 B2 | 8/2008 | Hrle et al. | |
| 2005/0081099 A1 * | 4/2005 | Chang et al. | 714/15 |
| 2007/0088754 A1 | 4/2007 | Brannon et al. | |
| 2010/0011178 A1 * | 1/2010 | Feathergill | 711/162 |

OTHER PUBLICATIONS

International Search Report PCT/US2009/042175 dated Nov. 30, 2009; pp. 1-3.
Written Opinion PCT/US2009/042175 dated Nov. 30, 2009; pp. 1-5.
FilesX Data Sheet : FilesX tapeless branches centralized backup and recovery. 2005 FilesX, Inc.

* cited by examiner

*Primary Examiner* — Pierre-Michel Bataille
(74) *Attorney, Agent, or Firm* — Perkins Coie LLP

(57) ABSTRACT

Techniques introduced here support block level transmission of a logical container from a network storage controller to a backup system. In accordance with the techniques, transmission can be restarted using checkpoints created at the block level by allowing restarts from various points within a logical container, for example a point at which 10%, 50%, or 75% of the logical container had been transmitted. The transmission can be restarted while maintaining data consistency of the logical container data and included meta-data. Advantageously, changes made prior to a checkpoint restart to, for example, meta-data, do not lead to inconsistent logical container backups.

22 Claims, 7 Drawing Sheets

MAINTAINING CHECKPOINTS DURING BACKUP OF LIVE SYSTEM

BACKGROUND

A computing system typically stores data in logical containers, e.g., files, directories, volumes, logical units, as blocks of data. An operating system can store data blocks on a disk or other storage device in any convenient size, for example, a block size could be set to 4 kilobytes (KB), such as is convenient for transfer of blocks to random access memory which often uses a 4 KB memory page size. However, any convenient size either larger or smaller could be used. Where a logical container is 1 megabyte (MB) and a block size is 4 KB, for example, the logical container is stored as 256 blocks.

Further, logical containers often include more than just user data. Operating systems also store meta-data such as attributes and extended attributes. An attribute is a unit of meta-data associated with a logical container defining a property of a logical container. Attributes can refer to, for example last modified date & time, creation date, and read/write access permission. An extended attribute is a unit of meta-data including additional information about a logical container. Extended attributes can vary between operating systems. Examples of extended attributes can include access control lists (ACL), streams, and object IDs. Depending on the operating system used, the location, types and quantity of meta-data can vary.

Because stored data can become lost or corrupted for various reasons, it is desirable to make backup copies of logical containers stored in a computing system. It is also sometimes desirable to backup associated meta-data. One way of backing up data or meta-data is to perform a disk-to-disk backup. A disk-to-disk backup involves copying logical containers from a first disk to a second disk, typically over a network, but sometimes by direct connection; all attributes and extended attributes are copied along with the logical containers.

Should the logical containers on the first disk be lost or corrupted, the logical containers can be restored from the second disk. When logical containers are transmitted over a network during a backup, a socket connection is often used. A socket connection allows for inter-process communication such as between an operating system and a backup system. In some implementations, over the socket connection logical containers are transferred one at a time from the first disk to the second disk until all logical containers have been transferred. However, socket connections sometimes fail due to network failure, overloading, or other unforeseen difficulties.

Connection failure can be particularly inconvenient when a large logical container has been only partially transferred. Where network data transmission is expensive, the costs associated with re-transmission can be wasteful. The re-transmission of a large logical container can take a significant amount of time, and where the connection fails repeatedly, the logical container might not ever be completely backed up.

Further, it may be possible to backup part of a logical container and after recovering from a network connection failure, begin to copy the logical container where the backup process left off. However, where a logical container is partially backed up, but its attributes or other meta-data have changed since beginning the backup, continuing the backup process can lead to inconsistencies in the logical container. For example, the backup can include some data that is new and other data that is old. It can become necessary to begin the backup process of the logical container again, resulting in wasted time and computing resources.

DETAILED DESCRIPTION

Figure 1:
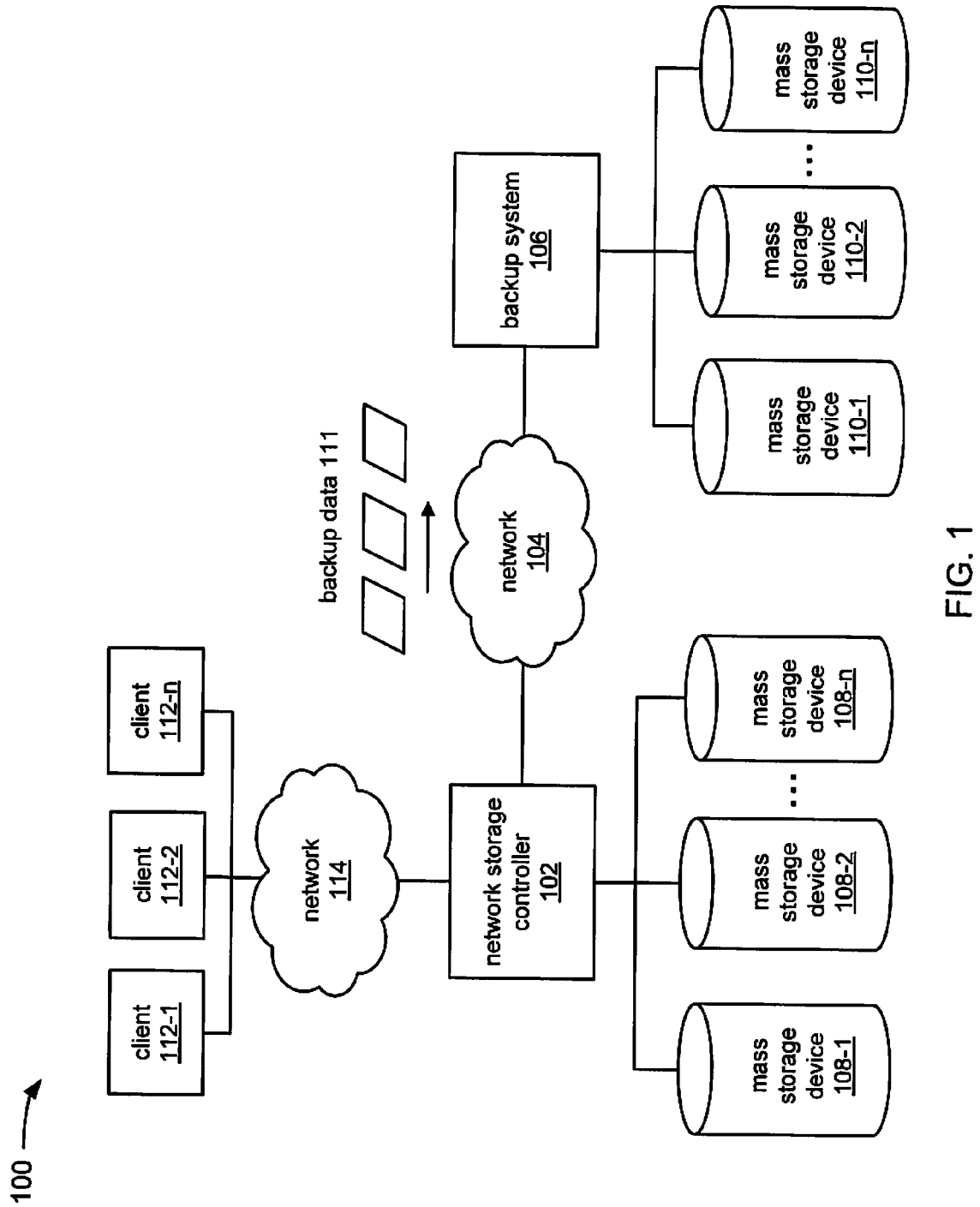
FIG. 1 is a diagram depicting a network storage controller connected to a backup system via a network.

In accordance with the techniques discussed herein, restarts of backups from checkpoints created at the block level are supported by allowing restarts from various points within a logical container while ensuring consistency of the logical container. The restart could begin at any checkpoint, e.g., 5% of completion, 50% of completion or another convenient checkpoint.

As used herein, a "checkpoint" is a record identifying the logical containers transferred and the number of bytes in the logical containers that have been transferred. The checkpoint can include the last modified time of the logical container as recorded from the operating system at the beginning of transmission of the logical container.

As used herein, "consistency" of a backup of a logical container is the uniformity of user data and meta-data in the backup relative to the logical container.

An example of ensuring consistency includes reflecting a change to an attribute in the backup of the logical container. Such an attribute can be transmitted to the backup system, for example, in a header sent at the restart of transmission. The backup system can receive the attribute and update the backup to reflect the changed attribute.

An example of ensuring consistency includes updating a backup to add, delete or replace an extended attribute in a logical container. Changes made to the extended attribute prior to restarting transmission can be recorded in a logical container meta-data database. The changed extended attribute can be transmitted at the checkpoint restart or at another convenient time. Where extended attributes are deleted, the backup system can be instructed to delete the extended attributes from the backup. Further, such a database may also track attributes.

At times, user data changes, or changes to a backup system can result in inconsistent backups, such as where the backup is partially completed. As such, changes to the user data or backup configuration can be handled by re-transmitting user data from the beginning of the logical container.

Advantageously, changes made prior to a checkpoint restart, for example, changes to meta-data (e.g., access control lists (ACLs), streams, object IDs), and changes to configurations of a backup system do not cause inconsistent logical container backups. The techniques include supporting block level checkpoints for an operating system that is under constant use.

In backing up logical containers, meta-data including attributes and extended attributes of the logical container are copied. Data included in the logical container is copied to a backup system on a per block basis. At regular intervals, e.g. every 5 min, a checkpoint is created. The backup application can save a checkpoint at any given time. Each checkpoint is numbered, and the checkpoints are saved. At some point in the backup process, the backup might fail or be interrupted. Thus, in that case the backup is restarted from a block level checkpoint by resuming transmission of the logical container at the point at which the last checkpoint was created.

Where changes to the logical container meta-data are made prior to the interruption, the meta-data, such as attributes and extended attributes are transferred. If the logical container data have not changed and only the logical container attributes have changed (e.g., the logical container's "read only" status has been changed to allow read and write access), then the attributes can be transferred without re-transmitting the data in the logical container. Advantageously a portion of the logical container is not re-transmitted, saving bandwidth and decreasing backup times.

The techniques introduced here also handle changes to the configuration of the backup system. An example of a change to the configuration of the backup system is a change to the block size used by the backup system. Such a change can render error detector meta-data such as the checksum meaningless. Normally, the checksum can be used to identify changed portions of the logical container that need to be resent. Since the block size can be changed prior to a checksum restart, a change to the block size used by the backup system can be handled by resending the entire logical container.

FIG. 1 is a diagram depicting a network storage controller connected to a backup system via a network. FIG. 1 shows the network storage controller 102, network 104, backup system 106, mass storage device 108-1, mass storage device 108-2, and mass storage device 108-*n* (collectively mass storage devices 108), mass storage device 110-1, mass storage device 110-2, and mass storage device 110-*n* (collectively mass storage devices 110), backup data 111, client 112-1, client 112-2, client 112-*n* (collectively clients 112), and network 114. The mass storage devices 114 are coupled to the network storage controller 106 and the mass storage devices 110 are coupled to the backup system 106.

The network storage controller 102 includes a storage operating system (not shown) that includes a storage manager to logically organize data and to control storage access operations. The storage manager can implement a hierarchical structure of directories and files on logical units. Data stored by a network storage controller 102 can be stored in basic units of data called blocks. Files or logical units can be defined from multiple blocks, as can larger units of storage, such as volumes.

The network storage controller 102 can implement network storage protocols, such as iSCSI, FCP (Fibre Channel Protocol), NFS (Network File System), SMB/CIFS (Server Message Block/Common Internet File System), hypertext transfer protocol (HTTP), transmission control protocol/internet protocol (TCP/IP), or any known convenient protocol. The network storage controller 102 manages data in the mass storage devices 108. The network storage controller 102 typically includes internal memory, such as dynamic random access memory (DRAM), for buffering data to be read from and written to the mass storage system.

The network 104 may be, for example, a local area network (LAN), wide area network (WAN), metropolitan area network (MAN), global area network such as the Internet, a Fibre Channel fabric, any combination of such networks, or any other known convenient medium for communicating data. The network 104 can include routers, switches and/or other networking hardware elements coupled together to provide communications to systems or within systems and devices coupled to the network 104.

The backup system 106 can be any type of computing system operable to create or store backup copies of logical containers. The backup system 106 is operable to restart a backup from a checkpoint, that is to say, when transmission of a logical container to a backup system is interrupted, the backup system 106 can begin to receive transmission of the logical container at the point in the logical container where the most recent checkpoint was created.

The mass storage devices 108 and the mass storage devices 110 can be, for example, hard disk drives, such as magnetic hard disks, optical disks, or another form of storage for persistently storing large amounts of data.

The backup data 111 can include blocks of data transmitted by the network storage controller 102 to the backup system 106.

The clients 112 can be individual personal computers, server class computing devices, or any known or convenient computing systems operable to store data over a network on a network storage controller. The clients 112 can store and retrieve data using network storage protocols, such as iSCSI, FCP (Fibre Channel Protocol), NFS (Network File System), SMB/CIFS (Server Message Block/Common Internet File System), hypertext transfer protocol (HTTP), transmission control protocol/internet protocol (TCP/IP), or any known or convenient protocol.

Referring still to FIG. 1, in operation, the network storage controller 102 can transmit logical containers to a backup system during a backup operation. Where more than one logical unit container is to be transmitted at a time, the network storage controller 102 can create a "snapshot" (a persistent point-in-time image) from a file system in use. From the snapshot, the network storage controller transmits each logical container to be backed up to the backup system 106. Alternatively, where a snapshot is not supported or available, a single logical container can be copied from the live file system and transmitted to the backup system.

During transmission, the network storage controller 102 may transmit logical containers one logical container at a time, on a block-by-block basis (i.e., one block at a time). During transmission of the logical container, the network storage controller 102 creates checkpoints recording the number of blocks of the logical container that have been transmitted. The checkpoints may also include the time at which the logical container was last modified. The checkpoints can be created at any convenient interval, e.g. every 5 minutes.

At some point an interruption may stop the transmission. Once the interruption has ceased, the network storage controller 102 then enters into a checkpoint restart to resume transmitting the logical container.

Figure 2:
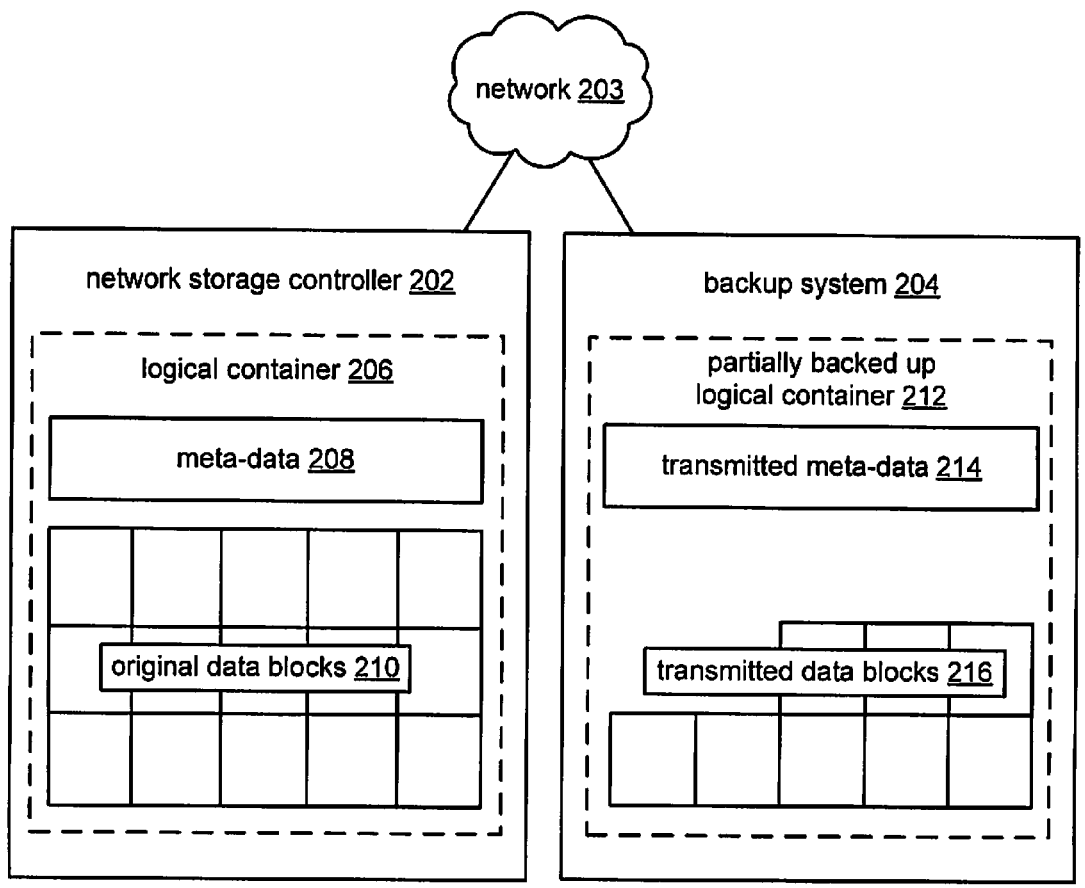
FIG. 2 is a diagram depicting a network storage controller entering into a checkpoint restart prior to resuming transmission of blocks of a logical container to a backup system.

FIG. 2 is a diagram depicting a network storage controller entering into a checkpoint restart prior to resuming transmission of blocks of a logical container to a backup system. FIG. 2 includes network storage controller 202, network 203, and backup system 204. Network storage controller 202 is coupled to backup system 204 via network 203. Network storage controller 202, network 203, and backup system 204 are as discussed in reference to FIG. 1.

Network storage controller 202 includes logical container 206. Logical container 206 includes meta-data 208 and original data blocks 210. The logical container stores information as defined above. The information can be divided into meta-data 208 and original data blocks 210. The original data blocks 210 comprise data stored by the logical container, while the meta-data 208 comprise, for example, streams including access control lists (ACLs), Object identifiers (IDs) and attributes (e.g. read only permission), filename, file size, last modified date, pointers and other meta-data.

The backup system 204 includes the partially backed up logical container 212 such as may have been transmitted up until an interruption occurred. The partially backed up logical container 214 includes the transmitted meta-data 214 and the transmitted data blocks 216. The transmitted meta-data 214 include the, e.g., streams, ACLs, object IDs and attributes, but the transmitted meta-data 214 do not reflect any meta-data modified, added or deleted prior to the interruption, if any.

Referring still, to FIG. 2, in operation, following the interruption (if any), the network storage controller 202 enters into a checkpoint restart to ensure file consistency prior to transmitting remaining blocks to the backup system 204. During the checkpoint restart from a block level checkpoint, several concerns are handled to ensure the consistency of logical containers that are transferred. In particular, at least the following are handled in certain implementations: (1) logical container data changes made prior to the checkpoint restart, (2) changes to logical container meta-data made prior to the checkpoint restart, but after beginning to backup the logical container, and (3) changes to a configuration of a backup system made prior to the checkpoint restart, but after beginning to backup the logical container.

In the case that logical container data changes prior a checkpoint restart, but after beginning to backup the logical container, it can be necessary to transfer the logical container from the beginning of the logical container. Where the logical container has been modified prior to the checkpoint restart, but after beginning to backup the logical container it can be assumed that the modifications are included in at least part of the previously transmitted data, and that the logical container can be re-backed up starting at the first logical block of the logical container.

Where the changes to the logical container meta-data have been made prior to the checkpoint restart, but after beginning to backup the logical container, the changed meta-data can be transmitted to the backup system 102. The backup system can then add meta-data, delete meta-data, or make changes to existing meta-data prior to resuming transmission of blocks of data. Where the configuration of the backup system has been modified, such as where a new block size is used for transmission, transmission of the logical container can begin from the beginning, or block 0 of the logical data container. Once all of the meta-data and all of the blocks of the logical container have been transmitted, the backup of the logical container is complete. Other logical containers can also be backed up in this same manner.

Figure 3:
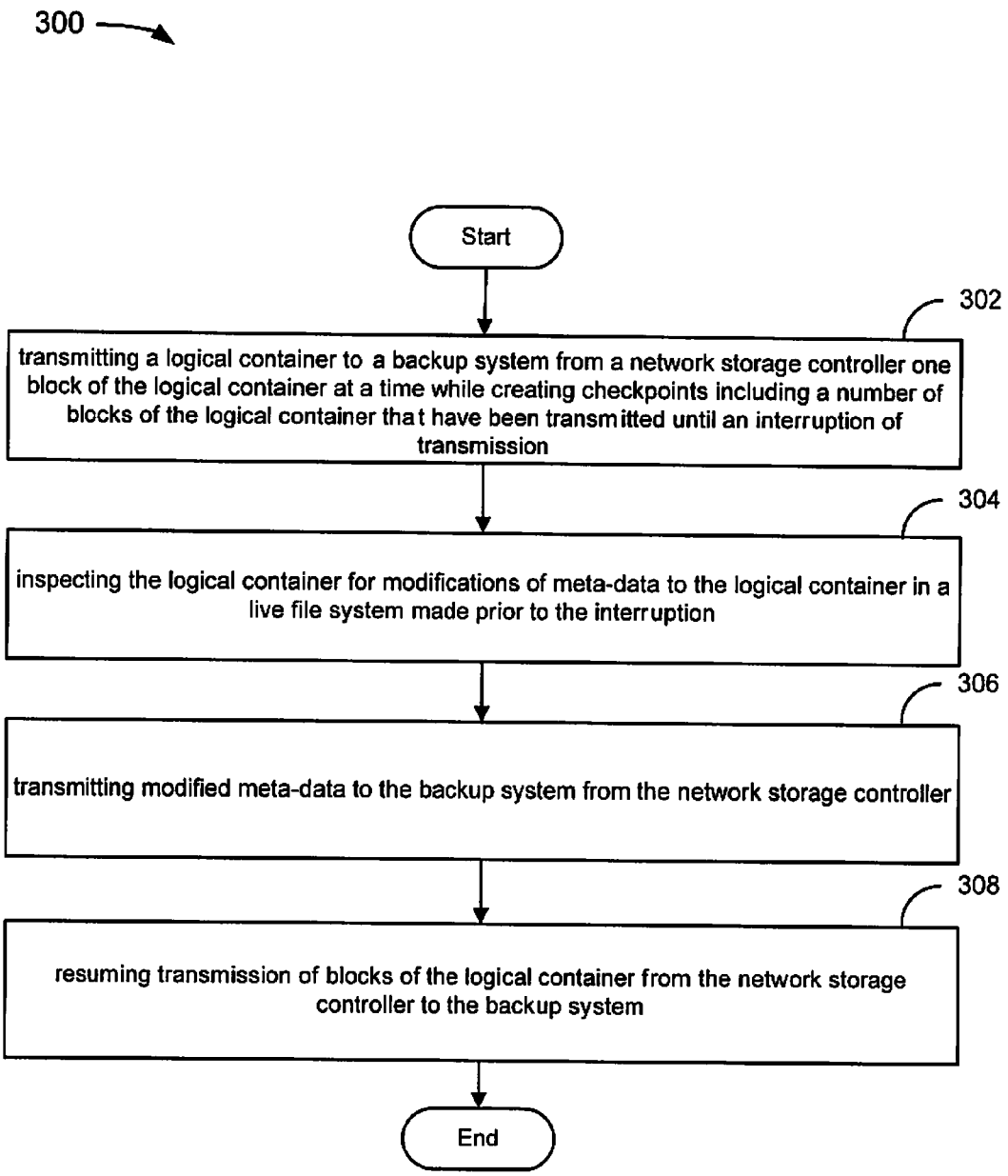
FIG. 3 is a flowchart of a process that can be performed by a network storage controller to backup a logical container.

FIG. 3 is a flowchart of a process that can be performed by a network storage controller to backup a logical container. The process is organized as a sequence of operations in the flowchart 300. An automated routine or a user triggers the process by indicating that a network storage controller should backup logical containers to a backup system.

In the example of FIG. 3, the process starts at 302 with transmitting a logical container to a backup system from a network storage controller one block of the logical container at a time, while creating checkpoints including the number of blocks of the logical container that have been transmitted until an interruption of transmission. The blocks can be transmitted over a network to the backup system, such as by using a socket connection. The network storage controller creates checkpoints while transmitting. The checkpoints include the number of blocks of the logical container that have been transmitted and the last time of modification of the logical container. The checkpoints can be created at any convenient interval of time or amount of data transmitted. The transmission can continue until an interruption of transmission.

In the example of FIG. 3, the process continues to 304 with inspecting the logical container for modifications of meta-data to the logical container in a live file system made prior to the interruption. Where the original logical container is in use, or the data in the logical container have been modified since the network storage controller began to transmit the logical container, it can be assumed that blocks throughout the logical container have been changed. The data of the logical container are retransmitted from the logical beginning of the logical container.

Alternatively, where a configuration of the backup system has changed since the beginning of transmission, restarting the transmission can be made in accordance with the new configuration. For example, an option to compute checksums of blocks on a block level increment can be changed or turned off. If the option is turned off, restarting transmission of the logical container can be made without computing check sums. If the option is changed, such as where a block size is changed from, e.g., 4 kb to 6 kb, then restarting of transmission can be accomplished using the larger block size.

In the example of FIG. 3, the process continues to 306 with transmitting modified meta-data to the backup system from the network storage controller. Several distinct cases present themselves for preparing changes to meta-data:

(1) A file attribute, e.g. read-only permission, is changed to read and write permission. Where a file attribute has changed then the changed attribute can be sent as a part of a header along with the remaining blocks.

(2) An Object ID or a stream is added to the logical container. In this case the remaining blocks can be transmitted and the logical container can be marked in a modified logical container meta-data database for follow up. Later, the new Object ID or stream can be transmitted to the backup system along with the next update.

(3) An Object ID or stream is deleted from the logical container. In this case, the remaining blocks can be transmitted and the logical container can be marked in the modified logical container meta-data database. A message can be transmitted to the backup system to delete the Object ID or stream from the logical container. The remaining blocks of the logical container can be transmitted to the backup system.

In the example of FIG. 3, the flowchart continues to 308 with resuming transmission of blocks of the logical container from the network storage controller to the backup system. As the interruption stopped the transmission of blocks of the logical container part way through the backup process a checkpoint can be used to decide where to begin re-transmitting blocks of the logical container. Blocks can be transmitted until the entire logical container has been transmitted. Having resumed transmission of blocks of the logical container, the process terminates.

Figure 4:
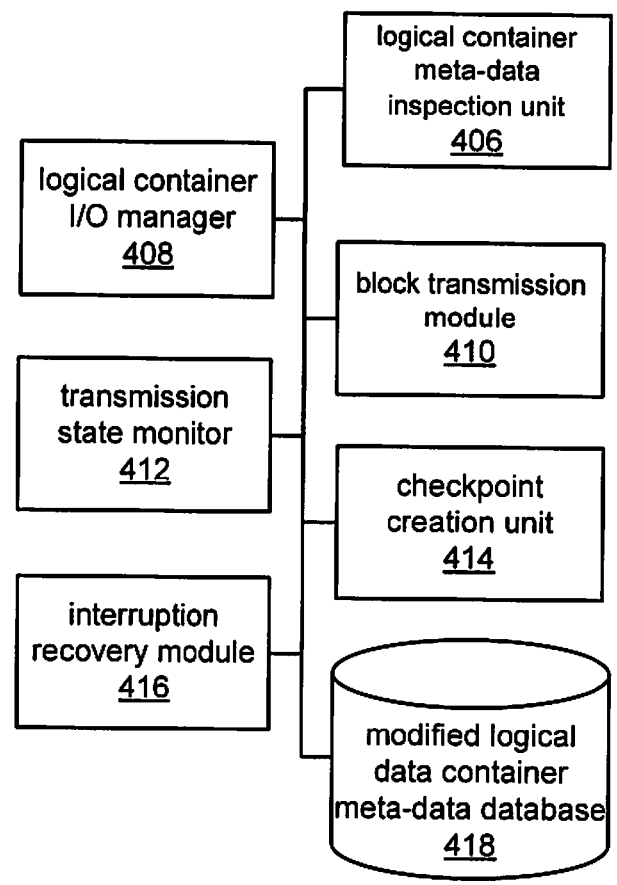
FIG. 4 is a high level block diagram of modules of backup software that can reside in a network storage controller defined in accordance with the techniques introduced here.

FIG. 4 is a high level block diagram of modules of backup software that can reside in a network storage controller defined in accordance with the techniques introduced here. FIG. 4 includes logical container meta-data inspection unit 406, logical container I/O manager 408, block transmission module 410, transmission state monitor 412, checkpoint creation unit 414, interruption recovery module 416, and modified logical container meta-data database 418. Each can be software, firmware, special-purpose hardware circuitry, or any combination there of.

The logical container meta-data inspection unit 406 is operable to compare a logical container with another logical container for changes in stored data and meta-data. Typically, the comparison is between a backup copy and a copy on a live file system, and the comparison is made to determine whether or not any changes have been made to the logical container since backup has begun. The copy can be created as a part of taking a snapshot of a number of logical containers from a live file system. Alternatively, the copy can be created directly from the logical container on the live file system solely for the purpose of backing up the file.

The logical container I/O manager 408 operates to control the reading of data from and writing of data to the logical container. A logical container can have data read from it for transmission to a backup system and can be written to in response to client-initiated work requests. The logical container I/O manager 408 can operate in conjunction with the block transmission module 410.

The block transmission module 410 operates to send the blocks of the logical container to a backup system. The block transmission module 410 can operate on any number of blocks or bytes or other subsets of a logical container.

The transmission state monitor 412 regularly checks and records the state of the transmission of blocks of a logical container to a backup system. Any interruptions in transmission are observed by the transmission state monitor 412 which can notify the interruption recovery module 416 to take action to restart transmission.

The checkpoint creation unit 414 monitors the number of blocks of a logical container that have been transmitted by the block transmission module 410 and includes this information in a checkpoint preferably along with the date and time that the logical container was last modified. When restarting from an interrupted transmission, the checkpoint can be used to determine how to proceed (e.g. from which point in the file to resume transmission).

The interruption recovery module 416 operates to recover from an interruption in transmission of a logical container. The interruption recovery module 416 can determine whether or not to restart from a checkpoint after considering whether or not there have been any changes to a logical container during transmission. The comparison can be made using the logical container meta-data inspection unit.

The modified logical container meta-data database 418 stores records of logical containers that have been modified since beginning transmission of blocks of data. The records can be used to determine which logical containers to consider when transmitting updates to a backup system.

Figure 5:
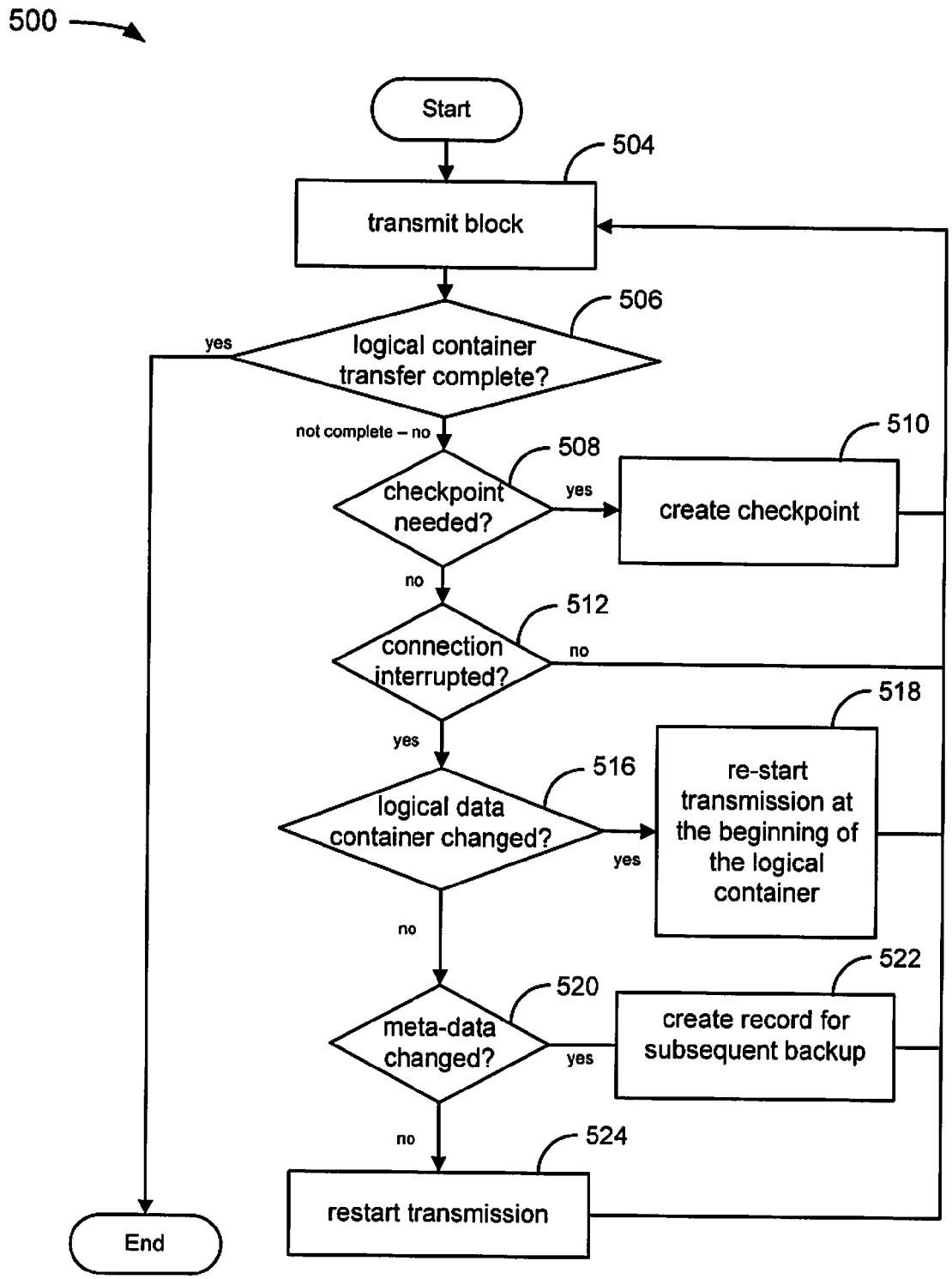
FIG. 5 is a flowchart of a process that can be performed by a backup unit in a network storage controller to backup logical containers.

FIG. 5 is a flowchart of a process that can be performed by a backup unit in a network storage controller to backup a logical container. The process is organized as a sequence of operations in the flowchart 500. An automated routine or a user triggers the process by indicating that a network storage controller should backup a logical container to a backup system.

In the example of FIG. 5, the process begins at 504 with transmitting a block. The block can be the first block of a logical container that is being backed up. Alternatively, the block can be an nth block of the logical container; that is to say that the process depicted can occur part way through the transmission of a logical container, such as when restarting transmission from a checkpoint.

In the example of FIG. 5 the process continues to 506 with deciding whether or not the transfer of the logical container is complete. If the transfer is complete then the process terminates, having completed the transmission of a logical container to a backup system.

If the answer at 506 is "not complete—no" then the flowchart continues to 508 with deciding whether or not a checkpoint is needed. The decision can be made on any known or convenient basis, such as whether an amount of time has passed or a certain amount of data have been transmitted.

If the answer is yes and a checkpoint is needed, then the process proceeds to 510 with creating a checkpoint. The checkpoint can be created to include a last modified time of the logical container and a number of blocks of the logical container that have been transmitted to the backup system. From 510, the process continues to 504.

In the example of FIG. 5, if the answer at 510 is no, then the flowchart continues to 512 with deciding whether the connection has been interrupted. If the answer at 512 is no, then the process proceeds to 504 with transmitting a block as discussed above.

If the answer at 512 is yes, then the process proceeds to 516 with determining whether the logical container has changed. The decision can be made by comparing the last modified time of the logical container in the live file system with that of the copy from the snapshot which is transmitted to the backup system. The time can be saved when the logical container was copied or included in a snapshot prior to beginning transmission, and such time can be included in a checkpoint.

If the decision at 516 is yes, then the process proceeds to 518 with re-starting transmission at the logical beginning of the logical container. The transmission can be restarted at the first block in the logical container. From 518, the process continues to 504.

If the decision at 516 is no, then the process proceeds to 520 with deciding whether the meta-data have changed. If any ACLs, Object IDs, or attributes have been changed, added or deleted, then the answer at this point will be yes, and the process will proceed to 522 with creating a record for subsequent backup. The record can be stored in a modified meta-data database and used to indicate that the changed meta-data should be transmitted to the backup system. From 522, the process loops back to 504.

If the decision at 520 is no, then the process continues to 524 with restarting transmission. A most recent checkpoint can be used to restart transmission. From 524 the process loops back to 504.

Figure 6:
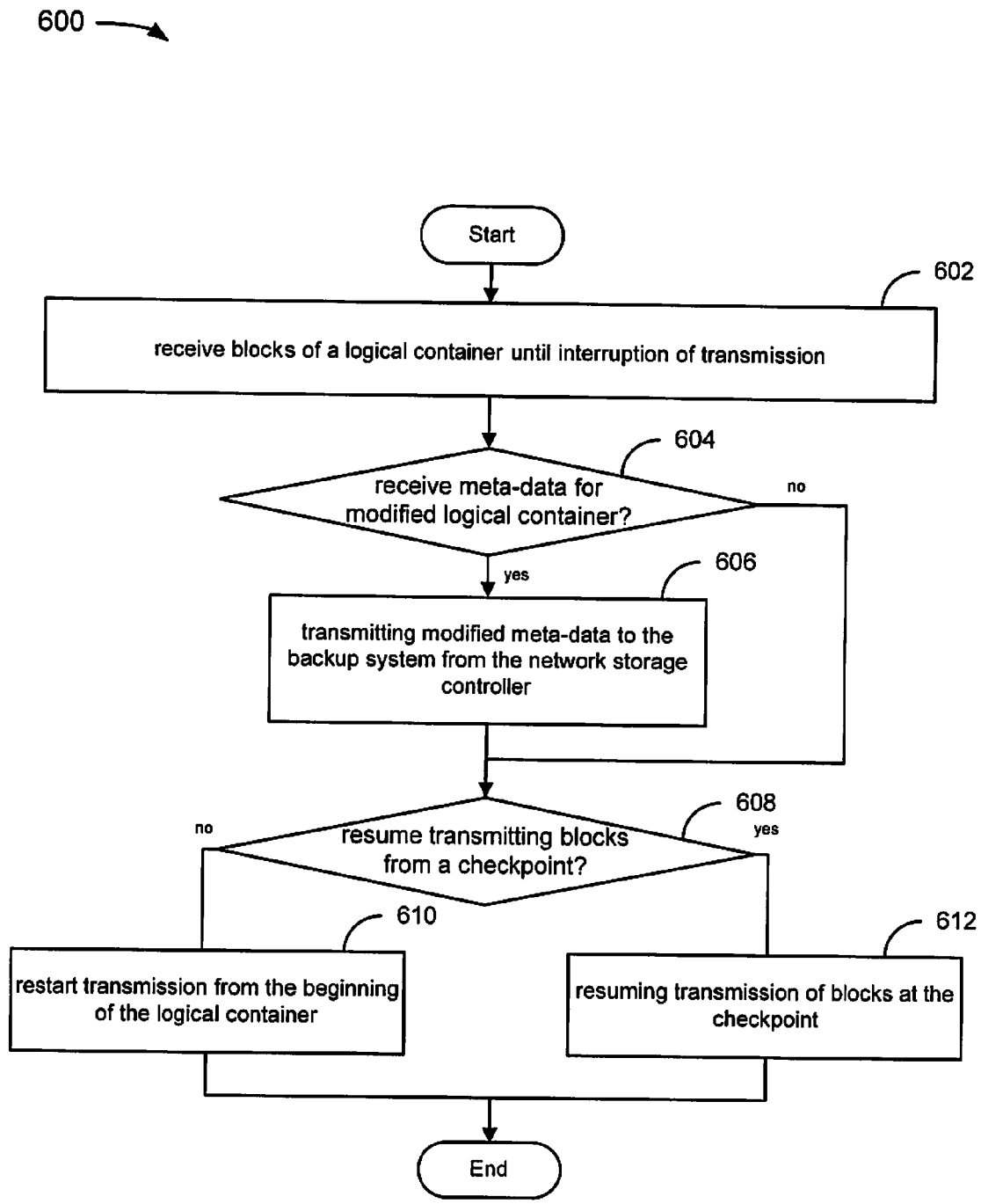
FIG. 6 is a flowchart of a process that can be performed by a backup system to recover from an interruption of transmission.

FIG. 6 is a flowchart of a process that can be performed by a backup system to recover from an interruption of transmission. The process is organized as a sequence of operations in the flowchart 600. An automated routine or a user triggers the process by indicating that a backup system should receive a backup of a logical container from a network storage controller.

In the example of FIG. 6, the process starts at 602 with receiving blocks of a logical container until interruption of transmission. A network storage controller can transmit a logical container to the backup system. The backup system can store the blocks locally, such as is depicted in FIG. 2. The interruption in transmission can be any interruption, for example, power failure or network error.

In the example of FIG. 6, the process continues to 604 with determining whether meta-data for the modified logical container will be received. If logical container meta-data is modified in a live file system, the network storage controller can send the modified meta-data to the backup system, such as in a header. Alternatively, if file data is modified it can be necessary to re-transmit the entire logical container.

In the example of FIG. 6, if the decision at 604 is yes, then the process continues to 606 with transmitting modified meta-data to the backup system from the network storage controller. The modified meta-data can be included in a header transmitted to the backup system. Alternatively, a record can be created indicating that the meta-data will be received along with a subsequent backup.

In the example of FIG. 6, from 606, or if the decision at 604 is no, then the process continues to 608 with deciding whether to resume transmitting blocks from a checkpoint. If the logical container data have been changed, or a configuration of the backup system has changed, the decision can be to restart from the beginning of the logical container. Alternatively, if no change has been made to the logical container, or if changes have been made only to the meta-data of the logical container then the decision can be to resume transmitting the logical container from a checkpoint.

If the answer at 608 is no then the flowchart continues to 610 with restarting transmission from the beginning of the logical container. If, for example, the data in the logical container has changed, or the backup system has changed configurations, then the blocks of the logical container can be received at the backup system starting at the beginning.

If the answer at 608 is yes, then the flowchart continues to 612 with resuming transmission of blocks at the checkpoint. The backup system can begin to receive blocks at the point where the backup system recorded the checkpoint. If so, the backup system receives the remaining blocks of the logical container.

From either 610 or 612, the flowchart terminates having received the blocks of the logical container.

Figure 7:
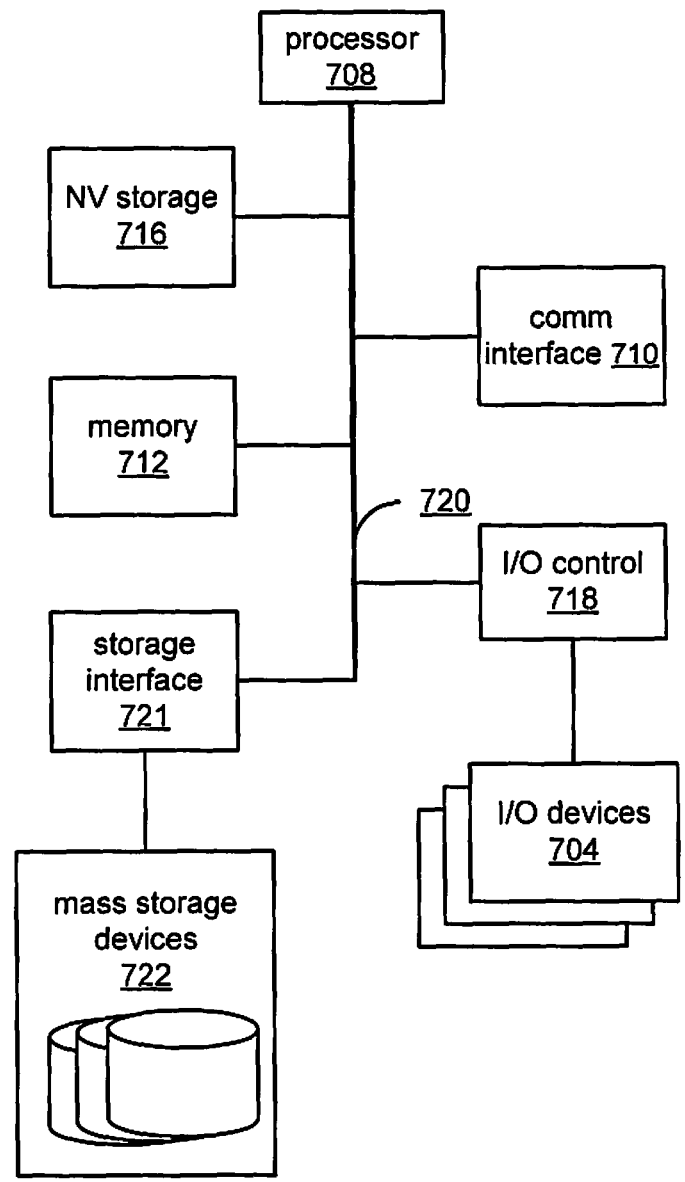
FIG. 7 is a high-level block diagram showing an example of the architecture of a processing system that can be representative of any of the processing systems discussed herein, such as a host or network storage controller.

FIG. 7 is a high-level block diagram showing an example of the architecture of a processing system that can be representative of any of the processing systems discussed herein, such as a network storage controller. The system 700 may be a conventional computing system that can be used as a client computing system, such as a personal computing system, hand held device, workstation, or server-class computing system. The system 700 includes I/O devices 704, processor 708, storage interface 721, a communications interface 710, memory 712, non-volatile storage 716, I/O controller 718.

The communications interface 710 may include a modem or network interface. The communications interface 710 can be an ethernet adapter, a Fibre Channel (FC) adapter, an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 708 may be, for example, a conventional programmable microprocessor such as an Intel Pentium microprocessor or Motorola power PC microprocessor. The memory 712 is coupled to the processor 708 by a bus 720. The memory 712 can be Dynamic Random Access Memory (DRAM) and can also include Static RAM (SRAM). The bus 720 couples the processor 707 to the memory 712, also to the non-volatile storage 716, to the display controller 714, and to the I/O controller 718.

The I/O devices 704 can include a keyboard, disk drives, printers, a scanner, and other input and output devices, including a mouse or other pointing device.

The non-volatile storage 716 can be or include a magnetic hard disk, flash memory, an optical disk, or another form of persistent storage for large amounts of data. Some of this data is often written, by a direct memory access process, into memory 712 during execution of software. One of skill in the art will immediately recognize that the terms "machine-readable medium" or "computer-readable medium" includes any type of information storage device that is accessible by the processor 708.

The storage interface 721 includes input/output (I/O) interface circuitry that couples the storage interface 721 to mass storage devices disks over an I/O interconnect arrangement, such as a conventional high-performance, FC (Fibre Channel) serial link topology. Information may be stored on any type of attached array of writable storage device media such as video tape, optical, DVD, magnetic tape, bubble memory, electronic random access memory, micro-electro mechanical and any other similar media adapted to store information, including data and parity information. The mass storage devices 722 are often magnetic hard disks, optical disks, or another form of storage for large amounts of data.

The system 700 is one example of many possible computing systems which have different architectures. For example, personal computers (PCs) based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

Network computing devices are another type of computing system that can be used in conjunction with the teachings provided herein. Network computing devices do not usually include a hard disk or other mass storage, and the executable programs are loaded from a network connection into the memory 712 for execution by the processor 708. A typical computing system will usually include at least a processor, memory, and a bus coupling the memory to the processor.

In addition, the system 700 is controlled by operating system software which includes a logical container management system, such as a disk operating system, which is part of the operating system software (these components are not shown in FIG. 7). One example of operating system software with its associated logical container management system software is the family of operating systems known as Data OnTap® from NetApp, Inc. of Sunnyvale, Calif., with its associated WAFL (write anywhere file layout) file system. The logical container management system is typically stored in the non-volatile storage 716 and causes the processor 708 to execute the various acts required by the operating system to input and output data and to store data in memory, including storing logical containers on the non-volatile storage 716.

The techniques discussed above allow checkpoint restarts from various points within a logical container while ensuring consistency of the backup of the logical container. In particular additions, deletions, and changes of meta-data are reflected in the backup. Advantageously, the meta-data and user data in the backup are consistent with the meta-data and user data of the logical container.

What is claimed is:

1. A method comprising:
   transmitting a logical container to a backup system from a network storage controller one block of the logical container at a time to create a backup of the logical container while creating a checkpoint including a number of blocks of the logical container that have been transmitted until an interruption of transmission; and restarting transmission of the logical container from the checkpoint including transmitting changed meta-data to the backup system to replace meta-data in the backup of the logical container to ensure consistency of the backup with changes to the meta-data of the logical container made prior to restarting transmission.

2. The method of claim 1 wherein the modified meta-data is transmitted from a snapshot including the logical container.

3. The method of claim 1 wherein the meta-data include an access control list that has been added since the beginning of transmission.

4. The method of claim 1 wherein the meta-data includes an access control list that has been modified prior to the interruption.

5. The method of claim 1 wherein all blocks of the logical container were previously transferred and only a header of the logical container including modified meta-data is transmitted.

6. The method of claim 1 wherein a checkpoint includes a number of blocks of a logical container that have been transmitted.

7. The method of claim 1 further comprising restarting transmission of blocks from a beginning of the logical container; wherein a configuration of the backup system has changed during transmission of the blocks.

8. A method comprising:
transmitting a block of a logical container to a backup system;
determining that the transmission of the logical container is not complete;
creating a checkpoint including a number of blocks of the logical container that have been transmitted;
determining that an interruption has caused the transmission to stop;
identifying changes to meta-data of a logical container;
recording an entry in a logical container meta-data database identifying changed meta-data of the logical container; and
restarting transmission of the logical container from the checkpoint including transmitting the changed meta-data to the backup system to replace meta-data in the backup of the logical container to ensure consistency of the backup for changes to meta-data made prior to restarting transmission.

9. The method of claim 8 further comprising creating a snapshot including the logical container.

10. The method of claim 8 wherein the changed meta-data includes a modified attribute.

11. The method of claim 8 wherein the changed meta-data includes an extended attribute that has been deleted.

12. The method of claim 8 wherein the changed meta-data includes a new object ID.

13. A network storage controller comprising:
a block transmission module sending a logical container to a backup system one block at a time while creating checkpoints, each checkpoint including a number of blocks of the logical container that have been transmitted;

a logical container meta-data inspection unit identifying an attribute modified prior to restarting transmission of the logical container; and an interruption recovery module instructing the block transmission module to restart transmission of the logical container from a checkpoint including transmitting the attribute to the backup system to store in the backup to ensure consistency of the backup with the logical container.

14. The network storage controller of claim 13 wherein the checkpoints each include a number of blocks of the logical container that have been transmitted and a time that the logical container was last modified in a system in use.

15. The network storage controller of claim 13 further comprising a transmission state monitor identifying an interruption of transmission in the transmission of blocks of the logical container.

16. The network storage controller of claim 13 further comprising a modified meta-data database to store records of logical containers indicating that logical container meta-data have changed.

17. The network storage controller of claim 13 wherein the logical container includes a modified object identifier and the network storage controller records an entry in a modified meta-data database indicating that the meta-data for the logical container have changed.

18. The network storage controller of claim 13 wherein the logical container includes a modified access control list, and the network storage controller records an entry in a modified meta-data database indicating that meta-data for the logical container have changed.

19. A computer readable medium storing instructions for execution by a processor of a network storage controller, the instructions comprising:
creating a snapshot including a logical container;
transmitting a copy of the logical container from the network storage controller to a backup system one block of the logical container at a time while creating checkpoints reflecting a number of blocks of the logical container that have been transmitted, until an interruption stops the network storage controller from transmitting; and
restarting transmission of the logical container from the checkpoint including transmitting changed meta-data to the backup system to replace meta-data in a backup of the logical container to ensure consistency of the backup with the logical container to reflect changes to the meta-data of the logical container made prior to restarting transmission.

20. The computer readable medium of claim 19 wherein the meta-data includes an access control list (ACL) that has been deleted since the snapshot has been created.

21. The computer readable medium of claim 19 wherein a configuration of the backup system has changed since the snapshot has been created, further comprising transmitting all user data from a beginning of the logical container.

22. The computer readable medium of claim 19 further comprising transmitting meta-data including an attribute that has been changed since the snapshot has been created.

* * * * *